US006305164B1

(12) United States Patent
Yamamoto et al.

(10) Patent No.: US 6,305,164 B1
(45) Date of Patent: Oct. 23, 2001

(54) METHOD AND SYSTEM FOR CONTROLLING HYDRAULIC DRIVING CIRCUIT

(75) Inventors: Shigeru Yamamoto; Toshihiko Fukasawa; Hisao Asada, all of Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/391,238

(22) Filed: Sep. 7, 1999

(30) Foreign Application Priority Data

Sep. 8, 1998 (JP) .................................. 10-253756

(51) Int. Cl.$^7$ .................................................. F16H 39/04
(52) U.S. Cl. ............................. 60/443; 60/452; 60/487
(58) Field of Search ...................... 60/443, 452, 450, 60/451, 487

(56) References Cited

U.S. PATENT DOCUMENTS

| 4,476,680 | * | 10/1984 | Pollman et al. ................... 60/452 X |
| 4,510,750 | * | 4/1985 | Izumi et al. ........................... 60/443 |
| 4,658,584 | * | 4/1987 | Suzuki et al. ...................... 60/443 X |
| 5,123,244 |   | 6/1992 | Kita et al. .............................. 60/452 |
| 5,177,964 | * | 1/1993 | Tanaka et al. ..................... 60/452 X |
| 5,628,188 | * | 5/1997 | Kordak ............................... 60/452 X |

FOREIGN PATENT DOCUMENTS

| 53-102104 | 9/1978 | (JP) . |
| 62-56384 | 11/1987 | (JP) . |
| 63-214557 | 9/1988 | (JP) . |
| 7-309590 | 11/1995 | (JP) . |

* cited by examiner

Primary Examiner—John E. Ryznic
(74) Attorney, Agent, or Firm—Armstrong, Westerman, Hattori, McLeland & Naughton, LLP

(57) ABSTRACT

A method and system for controlling a hydraulic driving circuit, which are simple in structure, capable of readily providing neutral position adjustment, manually adjustable and able to cope with a failure in the circuit. When an adjustment mode for adjusting the neutral position of a steering hydraulic pump is set, an offset command current value is calculated as a command current value to be output to a servo electromagnetic valve, and an offset command value calculated when a steering lever is in its neutral position is output to the servo electromagnetic valve to adjust the neutral position of the steering hydraulic pump.

9 Claims, 10 Drawing Sheets

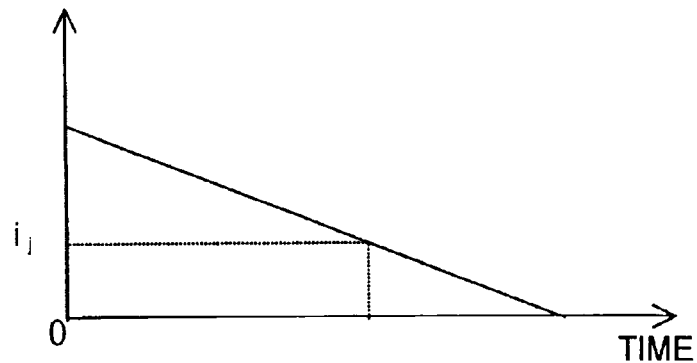
FIG. 7 (a) CHANGES IN SERVO COMMAND CURRENT VALUE
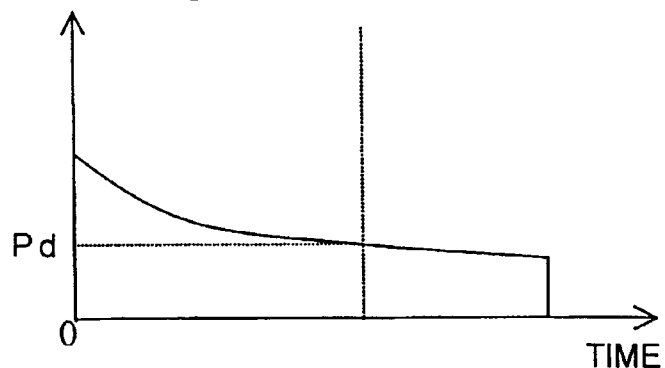
FIG. 7 (b) CHANGES IN CIRCUIT DIFFERENTIAL PRESSURE

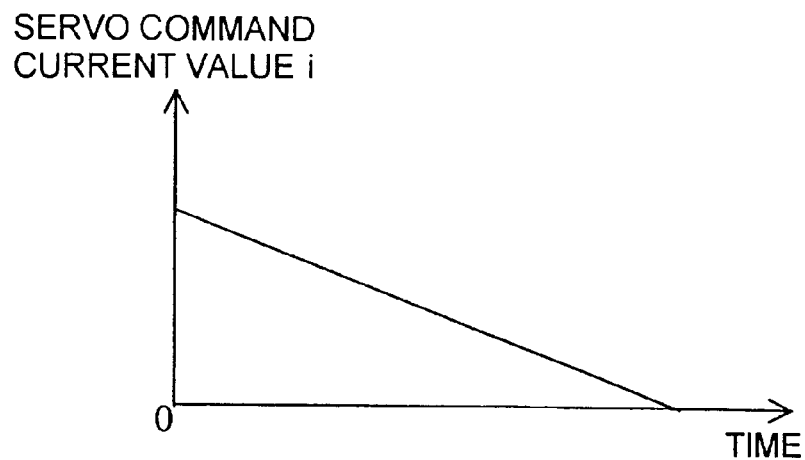
FIG. 9(a) CHANGES IN SERVO COMMAND CURRENT VALUE
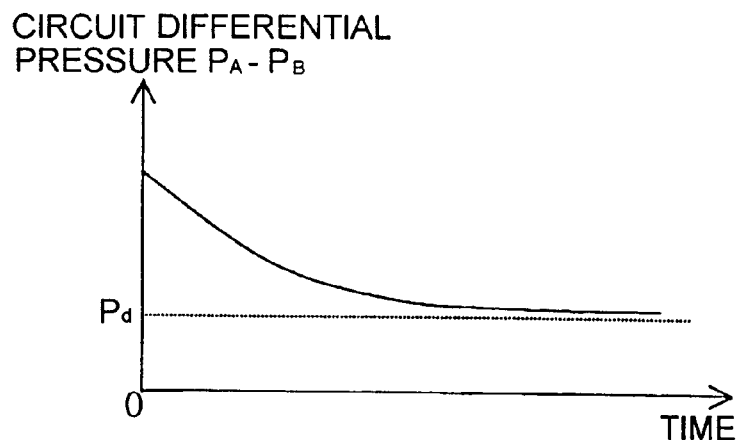
FIG. 9(b) CHANGES IN CIRCUIT DIFFERENTIAL PRESSURE
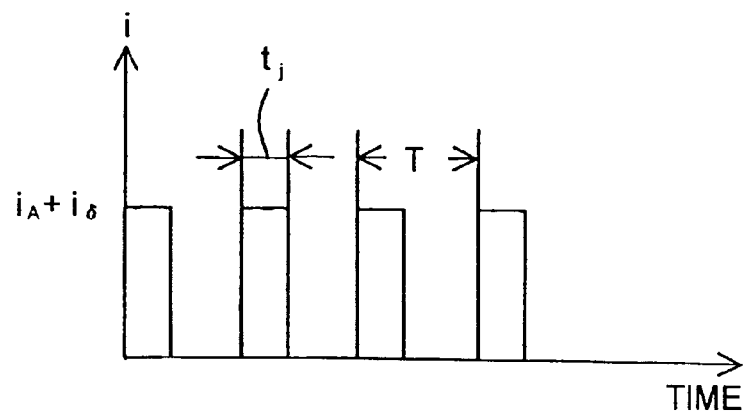
FIG. 9(c) SERVO COMMAND CURRENT VALUE

METHOD AND SYSTEM FOR CONTROLLING HYDRAULIC DRIVING CIRCUIT

TECHNICAL FIELD

The present invention relates to a method and system for controlling a hydraulic driving circuit comprising a variable displacement hydraulic pump and a hydraulic motor that is connected to the hydraulic pump through a closed loop oil line, in order to make the rotation of the hydraulic motor be zero when placing the operating lever in a neutral position to stop the hydraulic motor.

BACKGROUND ART

Many conventional construction machines such as bulldozers are equipped with a hydraulic transmission system in which a hydraulic motor is connected, through a closed loop hydraulic circuit, to a variable displacement hydraulic pump driven by an engine and the hydraulic motor is driven by pressure oil discharged from the hydraulic pump to rotate wheels by the output rotation of the hydraulic motor. Such a hydraulic pump is constructed as follows. Output voltage is input to a controller in accordance with the position of an electric operating lever, an output signal from the controller is sent to a servo electromagnetic valve to switch the servo electromagnetic valve, and according to switching of the servo electromagnetic valve, the angle of a swash plate is adjusted.

The hydraulic transmission system described above is designed such that when the operating lever is placed in its neutral position, the angle of the swash plate of the variable displacement hydraulic pump becomes zero, with the swash plate held at its neutral position. In reality, however, the relationship between a servo command current value i and servo displacement D is as shown in FIG. 10 according to which when the servo command current value i falls within the range $i_B < i < i_A$, the position of the pump servo is within the undefined region δ and the discharge of the hydraulic pump is released to either the servo A or the servo B in a minute amount. This leads to an undesirable situation in which the hydraulic motor is slightly rotated, even if the operating lever is in the neutral position. This is a problem inherent to closed loop hydraulic circuits. In cases where the above hydraulic motor is used as a steering motor, if such a phenomenon occurs, the vehicle will turn during straight-ahead driving. In cases where the above hydraulic motor is used as a driving motor, an occurrence of the phenomenon causes the vehicle to move during stop.

As attempts to solve the above problem, there have been conventionally proposed methods for detecting the neutral position of the swash plate of the hydraulic pump and methods for controlling the pump swash plate to be kept at the neutral position. Examples of the methods are as follows.

(1) The rotation of a hydraulic motor is sensed and a pump swash plate is constantly controlled so as to make the rotation of the hydraulic motor be zero.

(2) A shim or the like is put in a servo control valve for controlling a hydraulic pump, thereby mechanically controlling the valve.

(3) A bypass valve for providing connection across a closed loop hydraulic circuit is used and controlled to be open by means of a neutral position signal.

(4) To automatically detect the neutral position of the hydraulic pump, the swash plate is displaced until the pressure on the pump port becomes equal to a preset value. The values of displacement of the swash plate are collected to obtain their average and this average is used as a signal value indicating the neutral position of the hydraulic pump. (Japanese Patent Publication (KOKOKU) Gazette No. 62-56384(1987))

(5) The differential pressure across a port is detected. If this differential pressure is more than or equal to a specified value, the pump swash plate is adjusted in a direction to make the differential pressure be zero so that the pump swash plate is placed at its neutral position. (Japanese Patent Publication (KOKAI) Gazette No. 63-214557)

The method (1) is costly and complex in structure, because it disadvantageously requires an expensive motor rotation sensor capable of detecting low-speed rotation of a motor. In addition, this method is designed to constantly control the pump swash plate without changing modes and therefore there is the possibility of faulty operation in the event of a failure. In the method (2), mechanical adjustment is necessary, and therefore lots of skill and man-hour are required when there arises a need for re-adjustment. Another disadvantage of the method (2) is that the influence of the backlash and hysteresis of the servo control valve when it is in the neutral position cannot be avoided. The method (3) requires a bypass valve operable based on a neutral position signal and such a bypass valve must have a complicated and large valve structure. It is conceivable to solve this problem by employing a restrictor which is in an open state at all times, but this arrangement entails decreased circuit efficiency. The method (4) is complicated in system construction as well as in operation, because it is designed to detect the neutral position of the hydraulic pump by detecting the displacement of the swash plate a plurality of times and averaging detection values. The method (5) is similar to the method (1) in that the pump swash plate is constantly controlled without changing modes, so that the method (5) is also liable to faulty operation in the event of a failure.

The present invention is directed to overcoming the foregoing problems and a primary object of the invention is therefore to provide a hydraulic driving circuit controlling method and its associated system which are simple in structure, easy to carry out neutral adjustment and capable of manual adjustment so that they can cope with a problematic situation in the event of a failure.

DISCLOSURE OF THE INVENTION

According to a first aspect of the invention, the above object can be achieved by a method for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, wherein when an adjustment mode for adjusting the neutral position of the hydraulic pump is set, an offset command current value is calculated as a command current value to be output to the servo electromagnetic valve and a command current value obtained from a result of the calculation when the operating lever is in its neutral position is output to the servo electromagnetic valve to control the neutral position of the hydraulic pump.

In the method according to the first aspect of the invention, when an adjustment mode is set, an offset command current value is calculated as a command current value and an offset command current value when the operating lever is placed in its neutral position is output to the servo control valve for controlling the hydraulic pump. In this way, the discharge amount of the hydraulic pump is made to be zero. In other words, a command current value which allows the rotation of the hydraulic motor to be zero is output to the servo electromagnetic valve. Thus, adjustment for the neutral position of the hydraulic pump can be easily carried out in a short time at the time of assembling or replacement of the pump or motor. In addition, since mode selection is possible, faulty operation can be avoided even if there occurs a trouble within the hydraulic circuit in normal driving.

According to a second aspect of the invention, there is provided a method for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, wherein when an adjustment mode for adjusting the neutral position of the hydraulic pump is set, a command current value composed of rectangular waves is calculated as a command current value to be output to the servo electromagnetic valve and a command current value obtained from a result of the calculation when the operating lever is in its neutral position is output to the servo electromagnetic valve to control the neutral position of the hydraulic pump.

In the method according to the second aspect, when an adjustment mode is set, a rectangular wave command current value is calculated as a command current value. A rectangular wave command current value calculated when the operating lever is placed in its neutral position is output to the servo control valve for controlling the hydraulic pump. Thus, adjustment for the neutral position of the hydraulic pump can be easily carried out in a short time similarly to the first aspect, at the time of assembling or replacement of the pump or motor. In addition, since mode selection is possible, faulty operation can be avoided even if there occurs a trouble within the hydraulic circuit in normal driving.

According to a third aspect of the invention, there is provided a system for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, the control system comprising, as shown in the block diagram of FIG. 1 which shows the principle of the invention, (a) adjustment mode setting means for setting an adjustment mode for adjusting the neutral position of the hydraulic pump;

(b) command current value calculating means for calculating an offset command current value as a command current value to be output to the servo electromagnetic valve, upon setting of the adjustment mode by the adjustment mode setting means; and (c) neutral position adjusting means for adjusting the neutral position of the hydraulic pump by outputting to the servo electromagnetic valve an offset command current value calculated by the command current value calculating means when the operating lever is in its neutral position.

The system of the third aspect of the invention implements the controlling method for a hydraulic driving circuit according to the first aspect. This system is designed such that upon setting the adjustment mode by the adjustment mode setting means, an offset command current value is calculated as a command current value by the command current value calculating means, and when the operating lever is placed in its neutral position, an offset command current value calculated by the command current value calculating means is output to the servo control valve for controlling the hydraulic pump. Thus, adjustment for the neutral position of the hydraulic pump can be easily carried out in a short time similarly to the first aspect, at the time of assembling or replacement of the pump or motor. In addition, since mode selection is possible, faulty operation can be avoided even if there occurs a trouble within the hydraulic circuit in normal driving.

Preferably, the system according to the third aspect further comprises circuit differential pressure detecting means for detecting circuit differential pressure across the closed loop oil line and braking means for restraining the rotation of the output shaft of the hydraulic motor. Preferably, if the rotation of the output shaft of the hydraulic motor is restrained by the braking means, the command current value calculating means calculates, as an offset command current value, a command current value when the circuit differential pressure detected by the circuit differential pressure detecting means has reached a preset value or less. With this arrangement, the influence of backlash or hysteresis can be eliminated by easy operation and a simplified structure so that the neutral position of the hydraulic pump can be in the vicinity of zero, thereby permitting the rotation of the hydraulic motor to fall within the allowable range.

It is preferable that the neutral position adjusting means adjusts the neutral position of the hydraulic pump by outputting a command current value composed of rectangular waves to the servo electromagnetic valve, when the circuit differential pressure detected by the circuit differential pressure detecting means has not reached the preset value or less. With this arrangement, the neutral position of the hydraulic pump can be made to be in the vicinity of zero by easy operation, even when the circuit differential pressure detected by the circuit differential pressure detecting means does not reach the preset value or less.

In the system according to the third aspect, the hydraulic motor may be a steering hydraulic motor for use in a construction machine.

According to a fourth aspect of the invention, there is provided a system for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, the control system comprising:

(a) adjustment mode setting means for setting an adjustment mode for adjusting the neutral position of the hydraulic pump;

(b) command current value calculating means for calculating a command current value composed of rectangular waves as a command current value to be output to the servo electromagnetic valve, upon setting of the adjustment mode by the adjustment mode setting means; and (c) neutral position adjusting means for adjusting the neutral position of the hydraulic pump by outputting to the servo electromagnetic valve a command current value composed of rectangular waves calculated by the command current value calculating means when the operating lever is in its neutral position.

The system of the fourth aspect of the invention implements the controlling method for a hydraulic driving circuit according to the second aspect. This system is designed such that upon setting the adjustment mode by the adjustment mode setting means, a command current value composed of rectangular waves is calculated as a command current value by the command current value calculating means, and a command current value calculated by the command current value calculating means when the operating lever is placed in its neutral position is output to the servo control valve for controlling the hydraulic pump. Thus, adjustment for the neutral position of the hydraulic pump can be easily carried out in a short time similarly to the first aspect, at the time of assembling or replacement of the pump or motor. In addition, since mode selection is possible, faulty operation can be avoided even if there occurs a trouble within the hydraulic circuit in normal driving.

Preferably, the system according to the fourth aspect further comprises braking means for restraining the rotation of the output shaft of the hydraulic motor. Preferably, when the rotation of the output shaft of the hydraulic motor is restrained by the braking means, the command current value calculating means calculates a command current value composed of rectangular waves. With this arrangement, the rotation of the hydraulic motor can be set within an allowable range through simple operation.

In the system according to the fourth aspect, the hydraulic motor may be a steering hydraulic motor for use in a construction machine.

BRIEF EXPLANATION OF THE DRAWINGS

FIGS. 7(a) and 7(b) are graphs showing changes in circuit differential pressure relative to changes in a servo command current value in the control according to the first form.

FIGS. 9(a) and 9(b) are graphs showing changes in circuit differential pressure relative to changes in a servo command current value in the control according to the second form, and FIG. 9(c) is a graph showing a servo command current value composed of rectangular waves.

BEST MODE FOR CARRYING OUT THE INVENTION

Referring now to the accompanying drawings, a method and system for controlling a hydraulic driving circuit will be described according to a preferred embodiment of the invention.

Figure 1:
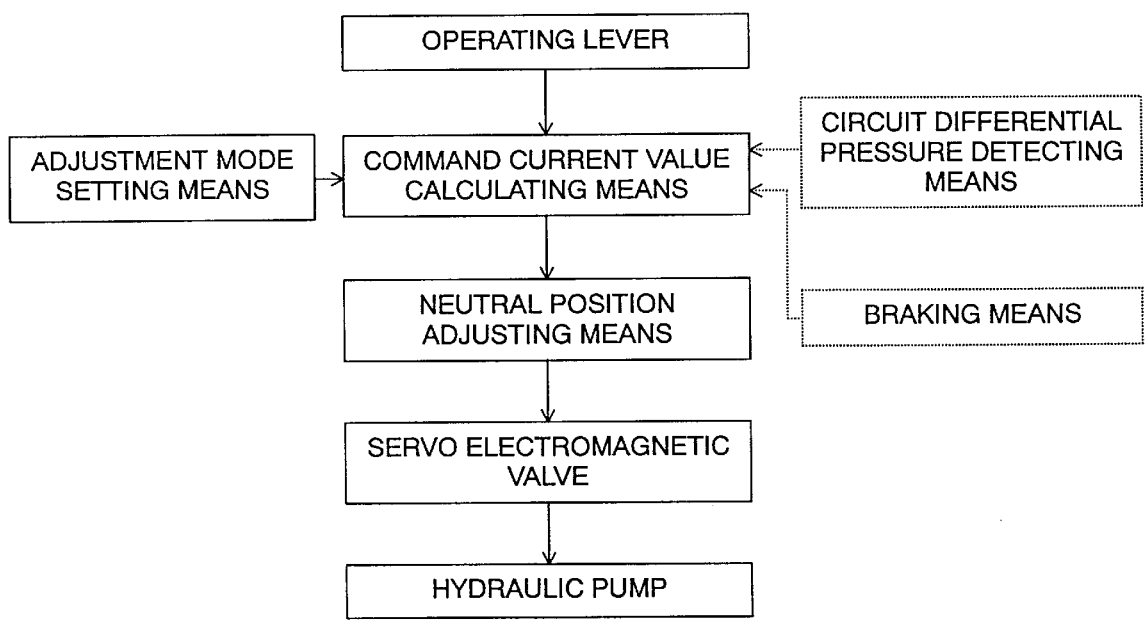
FIG. 1 is an entire block diagram showing the principle of the invention.
Figure 2:
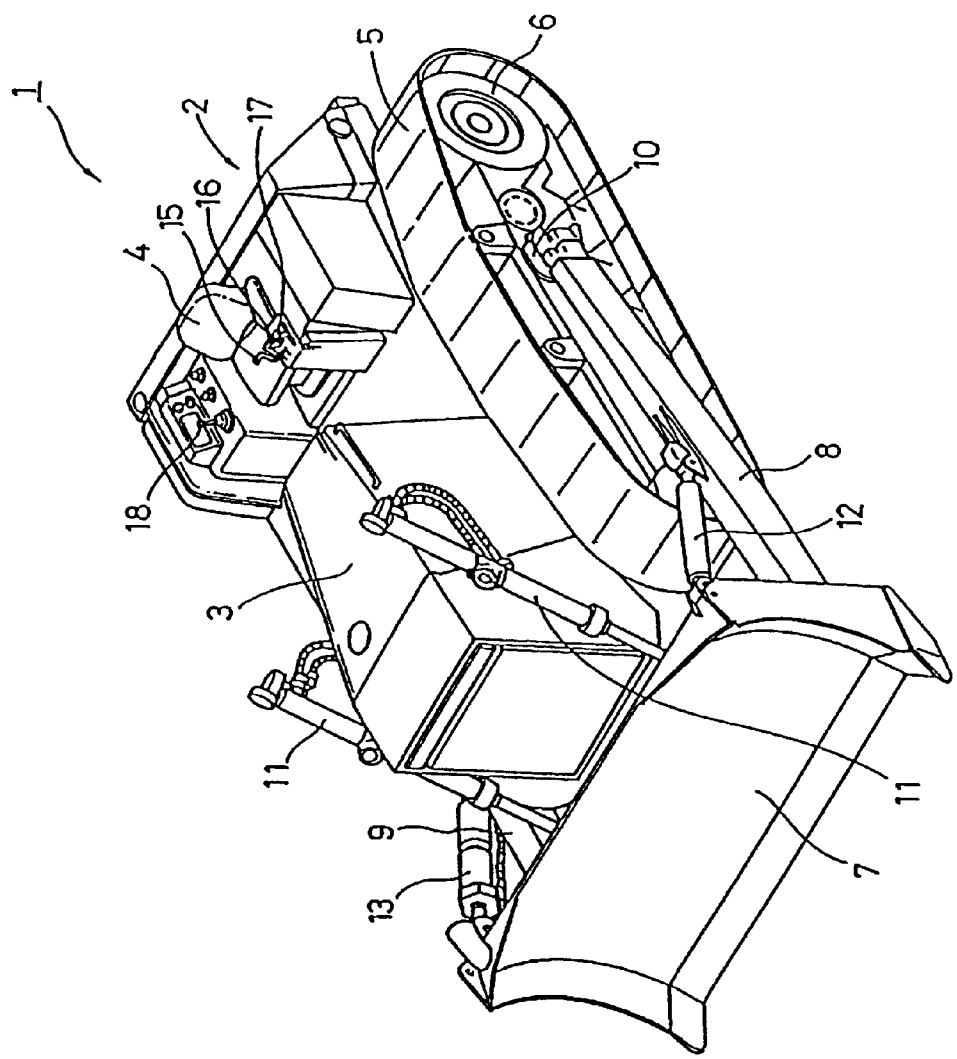
FIG. 2 shows the external appearance of an bulldozer according to an embodiment of the invention.

FIG. 2 shows the external appearance of a bulldozer constructed according to an embodiment of the invention.

In the bulldozer 1 of the present embodiment, there are provided a bonnet 3 and a cab 4 on a vehicle body 2. Disposed on both right and left sides of the vehicle body 2 when viewed in the forward traveling direction of the vehicle body 2 are crawler belts 5 for driving the vehicle body 2 so as to travel forwardly and reversely and turn. The crawler belts 5 are respectively independently driven by driving force transmitted from an engine with the aid of their corresponding sprockets 6.

A blade 7 is supported on the leading ends of right and left straight frames 8, 9 the base ends of which are, in turn, pivotally supported at the sides of the vehicle body 2 through trunnions 10 (the trunnion on the right side is not shown in the drawing) such that the blade 7 can be raised or lowered. A pair of side-by-side blade lift cylinders 11 are arranged between the blade 7 and the vehicle body 2, for raising or lowering the blade 7. A brace 12 and a blade tilt cylinder 13 are provided for laterally tilting the blade 7, with the former being positioned between the left straight frame 8 and the blade 7 and the latter being positioned between the right straight frame 9 and the blade 7.

Positioned on the left side of the cab 4 are a steering lever 15, a gear shift lever 16, a fuel controlling lever 17 while a blade controlling lever 18 or the like is disposed on the right side for raising, lowering, left-tilting and right-tilting the blade 7. Although not shown in the drawing, there is provided a decelerator pedal in front of the cab 4.

Figure 3:
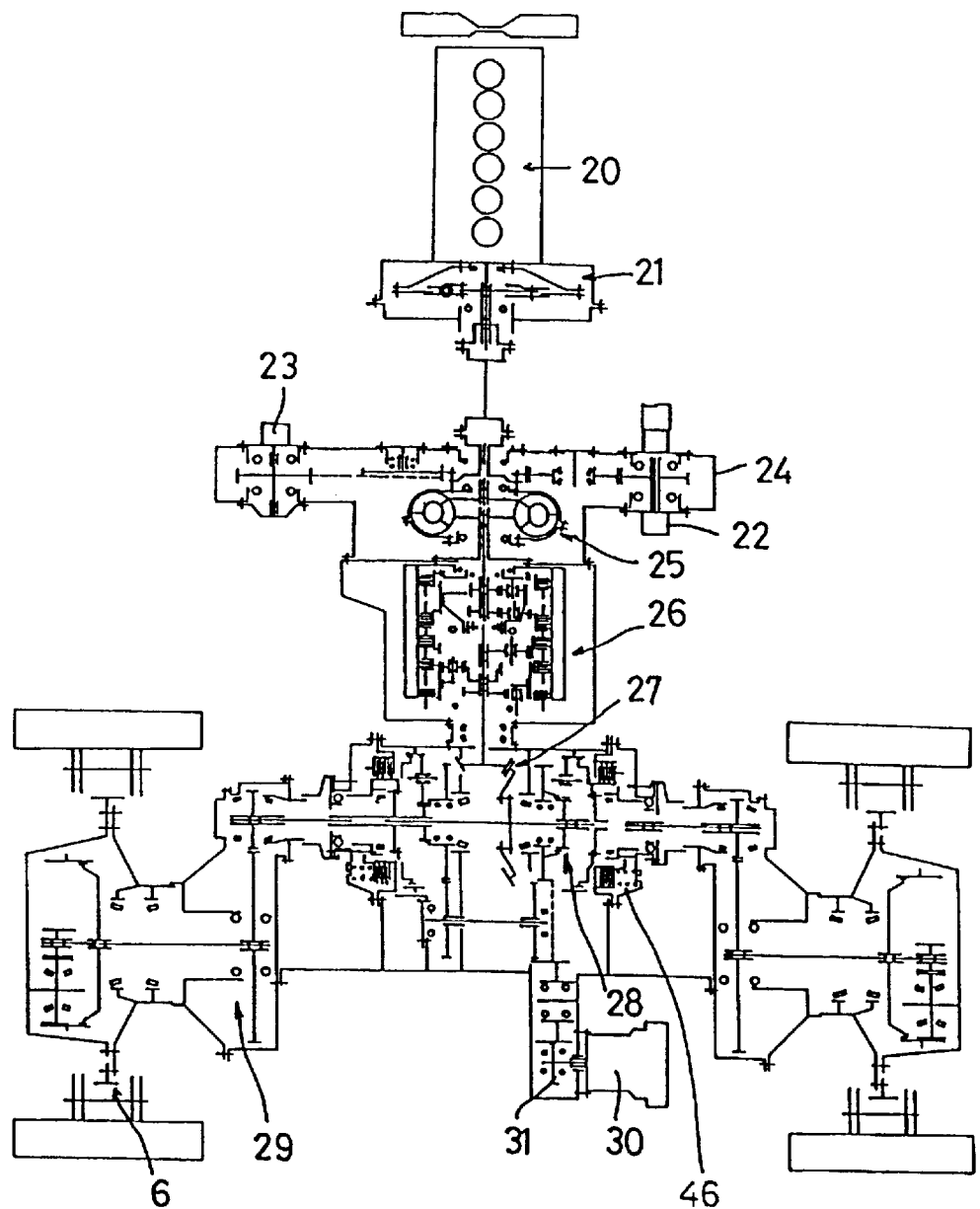
FIG. 3 shows a power transmission system according to the embodiment.

Referring to FIG. 3 that shows a power transmission system, driving force from an engine 20 is transmitted to a torque converter 25 through a damper 21 and a PTO 24 for driving various hydraulic pumps such as a hydraulic pump 22 for implements and an HSS pump (hydraulic pump for steering) 23. The driving force is then transmitted from the output shaft of the torque converter 25 to a transmission 26 (e.g., wet multiple disc clutch type planetary gear transmission) which has an input shaft connected to the output shaft of the torque converter 25. The transmission 26 comprises a forward drive clutch, a reverse drive clutch and first to third speed clutches, so that the output shaft of the transmission 26 is rotated in three speed ranges in both forward drive and reverse drive. The rotary driving force from the output shaft of the transmission 26 is transmitted through a bevel gear 27 to an HSS unit 28 including differential planetary gears and then to a pair of side-by-side final reduction gears 29 to drive the respective sprockets 6 for running the crawler belts 5. The HSS unit 28 is operatively coupled to a pinion 31 that is attached to the output shaft of an HSS motor (steering hydraulic motor) 30 driven by the steering hydraulic pump 23.

Figure 4:
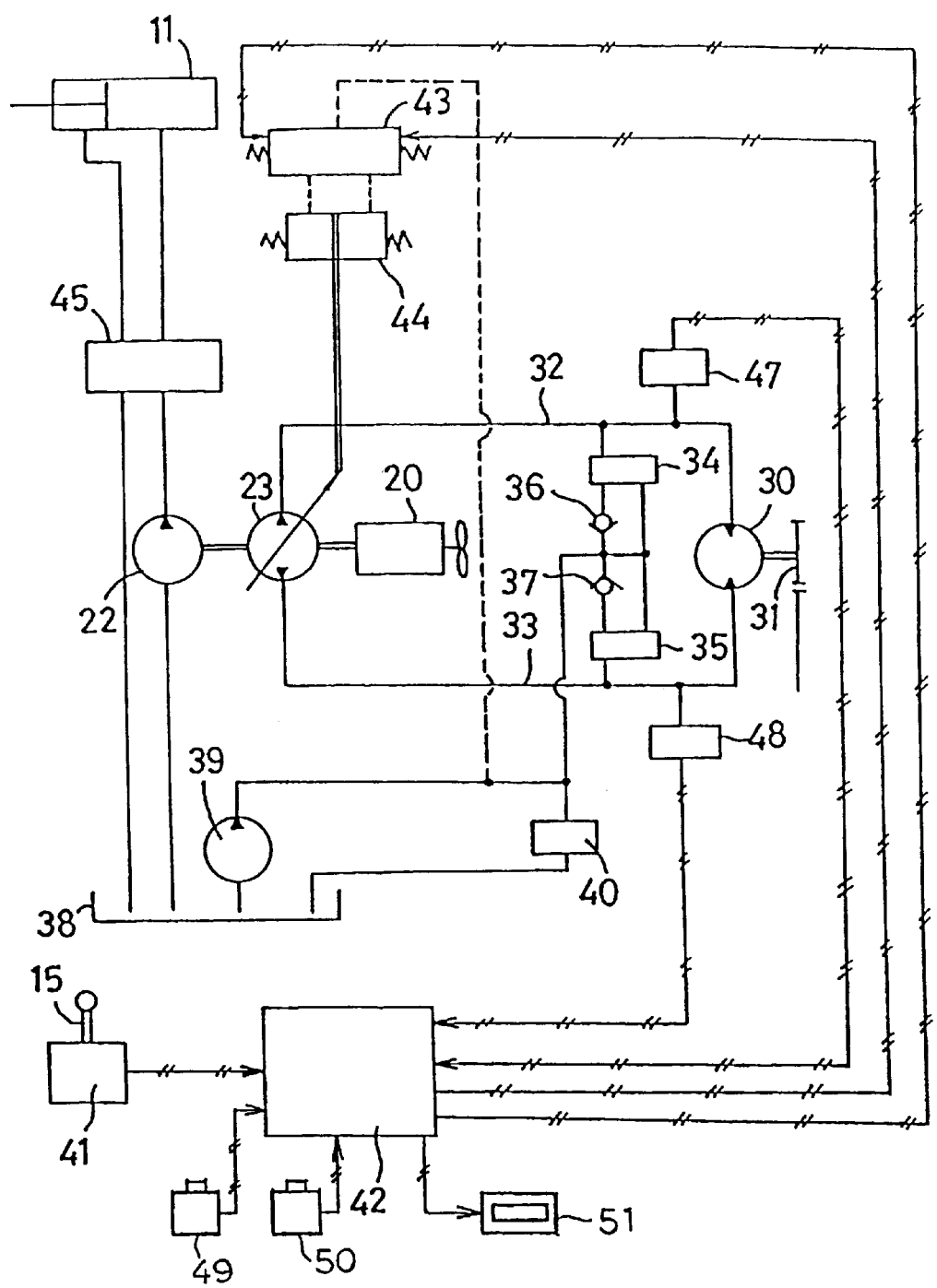
FIG. 4 shows a system structure of a control system according to the embodiment.

Referring to FIG. 4 that shows a system structure of a control system according to the embodiment, the steering hydraulic pump 23 driven by the engine 20 consists of a variable displacement hydraulic pump, and oil discharged from the steering hydraulic pump 23 is introduced, through a conduit 32 or 33, into the steering hydraulic motor 30 which consists of a fixed displacement hydraulic motor. The steering hydraulic circuit including these steering hydraulic pump 23 and steering hydraulic motor 30 is an independent closed circuit. The steering hydraulic motor 30 is rotated forwardly by pressure oil discharged from one side of the steering hydraulic pump 23, while pressure oil discharged from the other side allows the reverse rotation of the steering hydraulic motor 30. The conduits 32, 33 are respectively connected to a tank 38 through closed circuit relief valves 34, 35 and check valves 36, 37. Reference numerals 39 and 40 designate a fixed pump for charging and a relief valve for a charging circuit, respectively.

As noted earlier, the HSS unit 28 including the differential planetary gears is operatively coupled to the output shaft of the steering hydraulic motor 30 through the pinion 31. The HSS unit 28 adjusts the running speed of the right and left crawler belts 5 to turn the vehicle body 2. Normally, when the swash plate angle of the steering hydraulic pump 23 is made to be zero, the steering hydraulic motor 30 is stopped so that the vehicle body 2 does not turn.

When manually operating the steering lever 15, an output voltage corresponding to the position of the lever 15 is output from a potentiometer 41 and its output signal is input to a controller 42. An output signal from the controller 42 is input to a servo electromagnetic valve 43 and according to switching of the servo electromagnetic valve 43, the piston position of a pump servo 44 is controlled by pressure oil. According to this piston position, the swash plate angle of the steering hydraulic pump 23 is adjusted.

In an implement system hydraulic circuit for operating implement hydraulic cylinders typically represented by the blade lift cylinders 11, the aforesaid implement hydraulic pump 22 consisting of a fixed displacement hydraulic pump (a gear pump is used in this embodiment) is used, and oil discharged from the implement hydraulic pump 22 is supplied, through an operating valve 45, to a pressure chamber positioned on the bottom or head side of the implement hydraulic cylinders including blade lift cylinders 11, so that the implement hydraulic cylinders are operated.

Provided between the HSS unit 28 including the differential gears and the right and left final reductions gears 29 is a brake unit 46 (see FIG. 3) which also serves as a parking brake. To detect differential pressure between the conduits 32, 33 for connecting the steering hydraulic pump 23 and the steering hydraulic motor 30, there are provided oil pressure sensors 47, 48 for detecting the oil pressures of the conduits 32, 33, respectively.

To perform the neutral position adjustment of the steering hydraulic pump 23 when the steering lever 15 is in its neutral position, there are provided an adjustment mode switch 49 for selecting an adjustment mode and a starting switch 50 which is closed when starting detection of an allowable value Pd for circuit differential pressure (described later). Control signals from these switches 49, 50 are input to the controller 42. The controller 42 executes specified arithmetic operation based on the respective input signals. According to the result of the operation, a control signal is output to the servo electromagnetic valve 43, and the swash plate angle of the steering hydraulic pump 23 is controlled through the servo electromagnetic valve 43 and the pump servo 44. It should be noted that the controller 42 is provided with a differential pressure display unit 51 composed of an LED for indicating circuit differential pressure.

Figure 5:
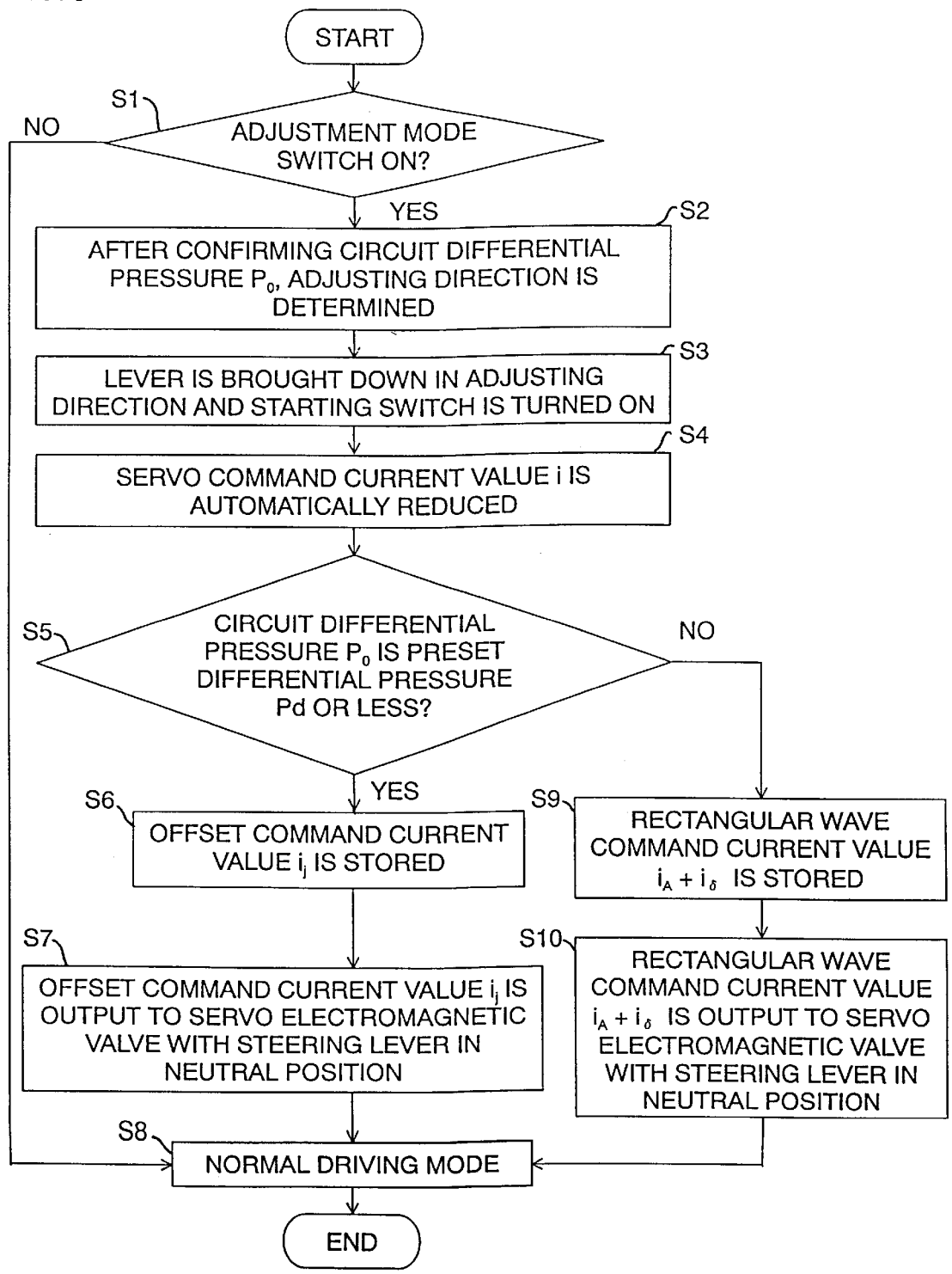
FIG. 5 is a flow chart of a process of steering neutral position adjustment.

Reference is made to the flow chart of FIG. 5 to describe the process of the neutral position adjustment according to this embodiment.

Figure 6:
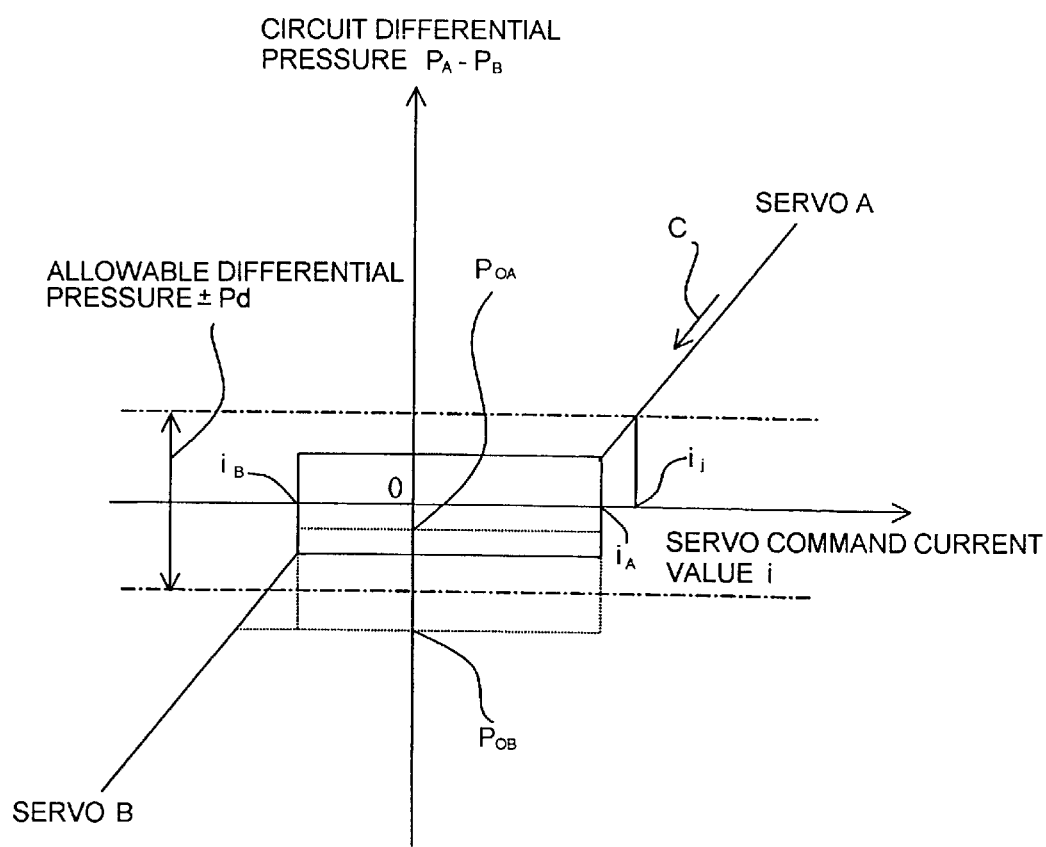
FIG. 6 shows a first form of control according to the embodiment.

Step S1: Upon turning on the adjustment mode switch 49, the brake unit 46 is operated to restrain the rotation of the output shaft of the steering hydraulic motor 30. At that time, the relationship between the command current value i of the servo and circuit differential pressure $P_O=P_A-P_B$ frequently does not fall within an allowable differential pressure range ±Pd as indicated by $P_{OA}$ to $P_{OB}$ designated by broken lines in FIG. 6.

Step S2: The direction of the displacement of the servo, that is, the direction of adjustment is determined by the code of the circuit differential pressure $P_O$ obtained from calculation with input signals from the oil pressure sensors 47, 48.

Steps S3 to S4: The starting switch 50 is turned on by bringing the steering lever 15 down in a direction opposite to the direction of the displacement of the servo (this opposite direction is toward the servo A in the example shown in FIG. 6). After turning on the switch 50, the controller 42 automatically reduces the servo command current value i gradually, for example, at a speed of 20 to 40 sec. (see arrow C of FIG. 6 and FIGS. 7(a) and 7(b))

Step S5: A check is made to determine if the circuit differential pressure $P_O$ is less than or equal to the set differential pressure Pd Step S6: If it is determined that the circuit differential pressure $P_O$ is less than or equal to the set differential pressure Pd, the command current value (offset command current value) $i_j$ at that time is stored.

Steps S7 to S8: When the steering lever 15 is in its neutral position, the offset command current value $i_j$ is output to the servo electromagnetic valve 43, thereby shifting to a normal driving mode. In this way, the rotation of the steering hydraulic motor 30 can be made to be less than or equal to the allowable value Pd.

Figure 8:
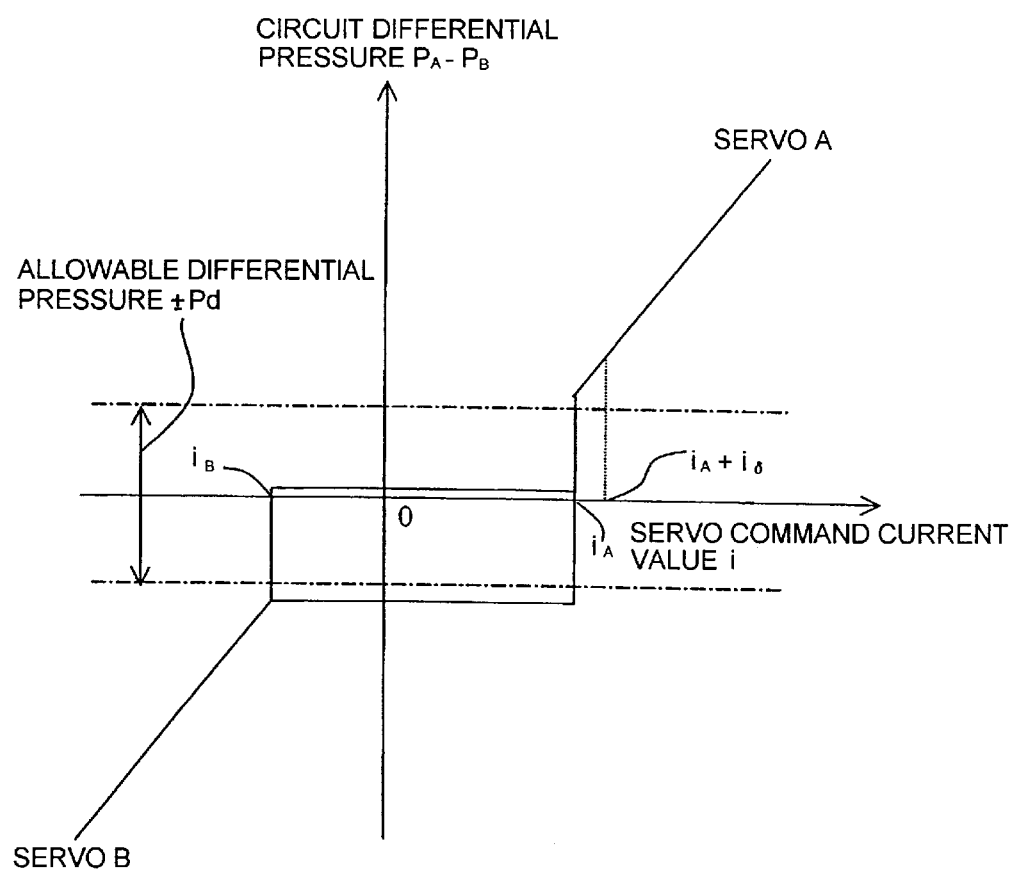
FIG. 8 shows a second form of control according to the embodiment.
Figure 10:
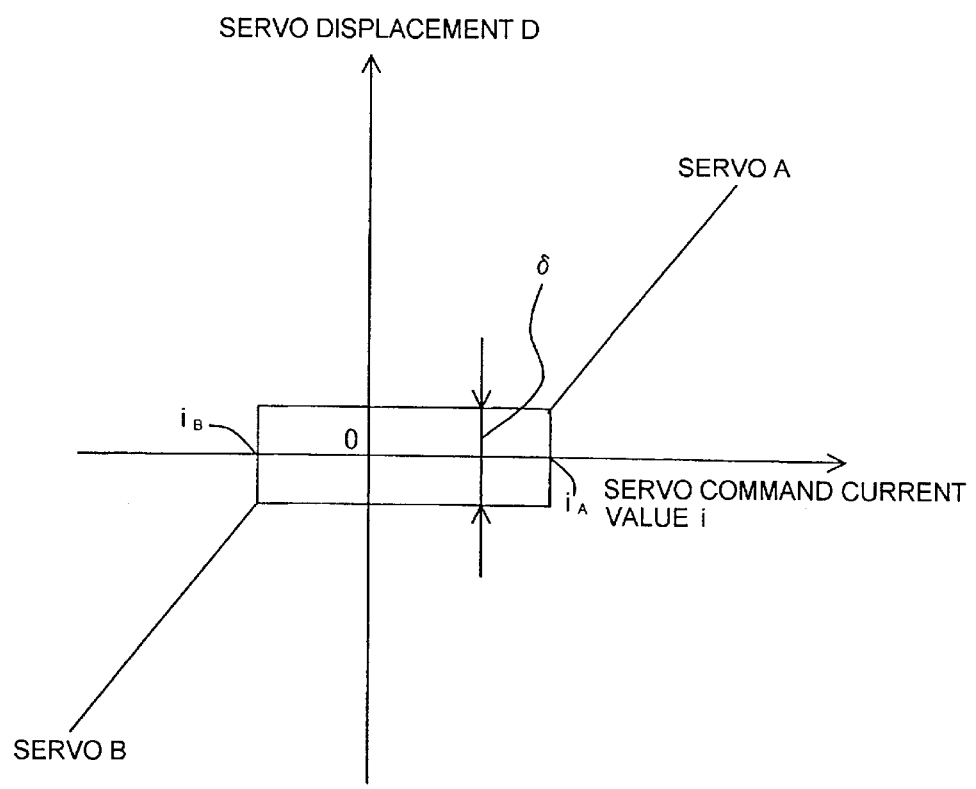
FIG. 10 is a graph showing the relationship between a servo command current value and servo displacement.

Step S9: If even when the servo command current value i is reduced, the circuit differential pressure $P_O$ does not become less than or equal to the set differential pressure Pd due to variations in the pumps, in other words, the offset command current value $i_j$ does not fall in the range of $i_B<i<i_A$ as shown in FIGS. 8 and 9(b), a rectangular wave command current value $i_A+i_\delta$ (see FIG. 9(c)) is stored as a command current value. It should be noted that the command current value $i_A+i_\delta$ is a little more than $i_A$.

Step S10: When the steering lever 15 is in its neutral position, the rectangular wave command current value $i_A+i_\delta$ is output to the servo electromagnetic valve 43, thereby shifting to the normal driving mode. It is preferable that the width $t_j$ of the rectangular wave be approximately equivalent to the response time of the pump servo (about 0.2 to 0.3 sec. in this embodiment) and its cycle T be two to four times the width $t_j$. In this way, the average servo position can be made to be close to zero and the rotation of the steering hydraulic motor 30 can be made to be less than or equal to the allowable value Pd.

In the present embodiment, when the adjustment mode is selected, the servo command current value is gradually reduced and the offset command current value $i_j$ obtained at the time when the circuit differential pressure $P_O$ becomes equal to the set differential pressure Pd is output to the servo electromagnetic valve 43. If the circuit differential pressure $P_O$ does not become equal to the set differential pressure Pd due to, for examples, variations in the pumps, the command current value $i_A+i_\delta$ composed of rectangular waves is output to the servo electromagnetic valve 43. This arrangement makes it possible to make the rotation of the steering hydraulic motor 30 be less than or equal to the allowable value Pd without fail when the steering lever 15 is in its neutral position.

According to the present embodiment, when the steering lever 15 is in its neutral position, control is performed in different ways, i.e., by outputting a servo command current value or by outputting a command current value composed of rectangular waves, depending on whether or not the circuit differential pressure $P_O$ is less than or equal to the set differential pressure Pd. However, it is possible to employ an alternative arrangement in which only a command current value composed of rectangular waves is outputted when the steering lever 15 is in its neutral position, without carrying out circuit differential pressure detection.

While the present embodiment is arranged to determine an offset command current value by detecting circuit differential pressure when the adjustment mode is selected, an offset command current value may be determined by detecting the rotation of the steering hydraulic motor instead of circuit differential pressure.

While the present embodiment is arranged to automatically set an offset command current value using a controller, it may be set by the operator. Concretely, the operator looks at the display of the differential pressure display unit 51 for indicating circuit differential pressure and manually sets an offset command current value by depressing a button. This enables setting of an offset command current value even when the controller fails or even when failure is diagnosed.

Although the present embodiment has been particularly described with a case where the circuit differential pressure $P_O$ is monitored with the output shaft of the steering hydraulic motor 30 being restrained from rotating by means of the brake unit 46, the circuit differential pressure PO may be monitored with the output shaft of the steering hydraulic motor 30 being free.

Although the present invention is applied to a hydraulic driving circuit for driving a steering hydraulic motor for use in a construction machine such as bulldozers in the present embodiment, it is readily apparent that the invention is also applicable to neutral position adjustment in other closed hydraulic circuits.

What is claimed is:

1. A method for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, said method comprising setting an adjustment mode for adjusting the neutral position of the hydraulic pump, calculating an offset command current value as a command current value to be output to the servo electromagnetic valve and inputting the command current value, obtained from a result of the calculating when the operating lever is in its neutral position, to the servo electromagnetic valve to control the neutral position of the hydraulic pump, said calculating being carried out with use of a differential pressure of the hydraulic driving circuit.

2. A method for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, said method comprising setting an adjustment mode for adjusting the neutral position of the hydraulic pump, calculating a command current value composed of rectangular waves as a command current value to be output to the servo electromagnetic valve and inputting the command current value obtained from a result of the calculating when the operating lever is in its neutral position to the servo electromagnetic valve to control the neutral position of the hydraulic pump.

3. A system for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, the control system comprising:
(a) adjustment mode setting means for setting an adjustment mode for adjusting the neutral position of the hydraulic pump;
(b) command current value calculating means for calculating an offset command current value as a command current value to be output to the servo electromagnetic valve, upon setting of the adjustment mode by the adjustment mode setting means;
(c) neutral position adjusting means for adjusting the neutral position of the hydraulic pump by outputting to the servo electromagnetic valve an offset command current value calculated by the command current value calculating means when the operating lever is in its neutral position;
(d) circuit differential pressure detecting means for detecting circuit differential pressure across the closed loop oil line; and
(e) braking means for restraining the rotation of an output shaft of the hydraulic motor, and wherein when the rotation of the output shaft of the hydraulic motor is restrained by the braking means, the command current value calculating means calculates, as an offset command current value, a command current value when the circuit differential pressure detected by the circuit differential pressure detecting means has reached a preset value or less.

4. A system for controlling a hydraulic driving circuit according to claim 3, wherein the hydraulic motor is a steering hydraulic motor for use in a construction machine.

5. A system for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, the control system comprising:
(a) adjustment mode setting means for setting an adjustment mode for adjusting the neutral position of the hydraulic pump;
(b) command current value calculating means for calculating an offset command current value as a command current value to be output to the servo electromagnetic valve, upon setting of the adjustment mode by the adjustment mode setting means;
(c) neutral position adjusting means for adjusting the neutral position of the hydraulic pump by outputting to the servo electromagnetic valve an offset command current value calculated by the command current value calculating means when the operating lever is in its neutral position;
(d) circuit differential pressure detecting means for detecting circuit differential pressure across the closed loop oil line; and
(e) braking means for restraining the rotation of an output shaft of the hydraulic motor;
wherein when the rotation of the output shaft of the hydraulic motor is restrained by the braking means, the command current value calculating means calculates, as an offset command current value, a command current value when the circuit differential pressure detected by the circuit differential pressure detecting means has reached a preset value or less; and wherein the neutral position adjusting means adjusts the neutral position of the hydraulic pump by outputting a command current value composed of rectangular waves to the servo electromagnetic valve, when the circuit differential pressure detected by the circuit differential pressure detecting means has not reached the preset value or less.

6. A system for controlling a hydraulic driving circuit according to claim 5, wherein the hydraulic motor is a steering hydraulic motor for use in a construction machine.

7. A system for controlling a hydraulic driving circuit comprising an operating lever, a servo electromagnetic valve to which a signal is input in accordance with the position of the operating lever, a variable displacement hydraulic pump controlled by the servo electromagnetic valve, and a hydraulic motor connected to the hydraulic pump through a closed loop oil line, the control system comprising:

(a) adjustment mode setting means for setting an adjustment mode for adjusting the neutral position of the hydraulic pump;

(b) command current value calculating means for calculating a command current value composed of rectangular waves as a command current value to be output to the servo electromagnetic valve, upon setting of the adjustment mode by the adjustment mode setting means; and (c) neutral position adjusting means for adjusting the neutral position of the hydraulic pump by outputting to the servo electromagnetic valve a command current value composed of rectangular waves calculated by the command current value calculating means when the operating lever is in its neutral position.

8. A system for controlling a hydraulic driving circuit according to claim 7, the system further comprising braking means for restraining the rotation of the output shaft of the hydraulic motor, and wherein when the rotation of the output shaft of the hydraulic motor is restrained by the braking means, the command current value calculating means calculates a command current value composed of rectangular waves.

9. A system for controlling a hydraulic driving circuit according to claim 7 or 8, wherein the hydraulic motor is a steering hydraulic motor for use in a construction machine.

* * * * *